Patented Sept. 5, 1950

2,521,344

UNITED STATES PATENT OFFICE 2,521,344

ALKYLATION OF AROMATIC HYDROCARBONS

Charles A Cohen, Roselle Park, and Clifford W. Muessig, Roselle, N. J., assignors to Standard Oil Development Company, a corporation of Delaware No Drawing. Application January 29, 1948, Serial No. 5,204

8 Claims. (Cl. 260—671)

This invention relates to the alkylation of aromatic hydrocarbons with olefin hydrocarbons to produce higher molecular weight alkylated hydrocarbons to whose nucleus is attached no more than one alkyl group derived from the olefinic alkylating agent. More specifically, the invention is concerned with a process for the alkylation of aromatics with olefin hydrocarbons as above described in the presence of a catalyst comprising an aluminum halide-chloroform complex.

The alkylation of aromatic hydrocarbons with olefin hydrocarbons to produce higher molecular weight addition products in the presence of aluminum halide catalysts has been known for some time. However, yields of monoalkylated aromatics from alkylation reactions in the presence of aluminum halides are not high, due among other things, to local high concentrations of the catalyst. Consequently, numerous attempts have been made to obtain higher yields of monoalkylates by improving the catalytic effect of the aluminum halide. Various materials have been so employed in conjunction with aluminum halides in the form of promoters, solutizers, etc. In these attempts, however, it has been found that many such materials employed to enhance the catalytic activity of aluminum halide fail to produce a homogenous reaction mixture, and in many instances cause complete separation of the aluminum halide from the reaction mass. This, of course, decreases contact between catalysts and reactants and slows down the reaction to a point where only small yields are obtained. Other materials form perfectly clear solutions of the aluminum halide and reactants. However, the solution shows little or no catalytic activity, or suppresses the catalytic effect of the aluminum halide to a degree where large quantities must be employed or where the yields obtained at equilibrium are low. Still other materials tested cannot be readily recovered from the reaction mixture and their use is, of course, not feasible. It is greatly desirable, therefore, that a material be found which will, when associated with an aluminum halide, (1) catalyze the alkylation of aromatic hydrocarbons with olefinic hydrocarbons to the exclusive production of an alkyl aromatic derivative containing only a single alkyl group derived from the olefin, (2) have no tendency to depolymerize to olefin when the olefin used for alkylation is a polymer of a simple olefin, (3) form a homogenous mass (dispersed or dissolved) with aluminum halide and the hydrocarbon reactants, and (4) permit its recovery from the reaction mass by simple means, such as distillation, after the reaction mass has been decomposed with water.

It has now been found that a complex of aluminum halide and chloroform is a material possessing, among others, the abovementioned desirable characteristics, and is cheap, available and easy to handle. It has been found that when aromatic hydrocarbons are alkylated with olefin hydrocarbons in the presence of a catalyst comprising the aluminum halide-chloroform complex, the mol % yield of monoalkylated derivative is higher than that obtainable with any other known modified aluminum halide catalyst, and in many instances, amounts to twice the yield obtainable with aluminum halide alone. In those instances in which the alkylation is performed with a mono-olefin which is not a polymer of a simple olefin, for example, dodecene-1, yields approaching the theoretical may be obtained.

The complex employed as the catalyst in the process of this invention is a complex comprising aluminum halide and chloroform in the molar proportion of from one to three mols of aluminum halide to one mol of chloroform, preferably two mols of aluminum halide to one mol of chloroform. The chloroform is an integral part of the catalyst composition and does not act exclusively as a solvent, since the activity and yields obtained are not independent of the amount of choloroform associated with the aluminum halide. When used in amounts which are substantially more or less than the values expressed above, the full activity of the aluminum chloride-chloroform complex is not realized. The amount of chloroform employed in the formation of the complex is well below the amount required for complete solubility since aluminum chloride, for example, is only soluble at 25° C. to the extent of 0.05 weight % in chloroform.

The aromatic hydrocarbons which may be subjected to alkylation according to the terms of this invention are the hydrocarbons of the benzene series, such as benzene, toluene, the xylenes, cumene, cymene, durene, etc. and poly-nuclear aromatics such as naphthalene, mono- and polyalkyl naphthalenes, tetralin, etc.

The olefinic hydrocarbons employed to alkylate the aromatic hydrocarbons according to the terms of this invention may be chosen from the following materials:

(a) The simple olefins, for example, propylene and the various butylenes such as butene-1, butene-2 and isobutylene. Various higher molecular weight olefins such as hexene-1, decene-1, dodecene-1, octadecene-1 and 2, etc.

(b) Those olefins which are polymers of simple olefins such as the hexenes obtained from the polymerization of propylene; the octenes resulting from the polymerization of isobutylene or copolymerization of isobutylene and other butylenes; dodecenes obtained by the polymerization of propylene or butylenes; copolymers obtained by the simultaneous copolymerization of propylene and butylene and the like, and (c) Cyclic olefins such as cyclohexene and nuclear substituted olefins such as styrene and the various terpenes. Diolefins and other poly-olefins may also be made to react with aromatic hydrocarbons but generally under different conditions of operation than those employed for the alkylation of aromatic hydrocarbons with the simple or polymeric type of olefin. The present invention is not limited to olefins derived from any particular source nor to the purity of olefin employed.

In the hydrocarbon mixture subjected to alkylation, it is preferable to have present from about 2 to 10 mols of aromatic hydrocarbon per mol of olefin hydrocarbon in order to minimize the tendency for poly-alkylation to occur. Usually from 4 to 5 mols of aromatic per mol of olefin is sufficient to accomplish the desired purpose, although with the higher molar proportions some slight increase in yield of mono-alkyl derivative is usually obtained.

The preferred method of operation is to mix the aluminum halide with the aromatic and the chloroform to form the complex and then add the olefin while maintaining reaction conditions. However, another feasible method of operation is to maintain the aluminum halide-chloroform complex in a small amount of aromatic diluent and concurrently feed either as separate streams or as single streams to the remainder of the aromatic and the olefin agent.

The temperature at which the alkylation process of this invention may be carried out varies from 0° C. up to 80° C., preferably 40° C. to 50° C. Temperatures lower than 40° to 50° C. usually require a prolonged reaction time and conversely higher temperatures favor depolymerization of those olefins used for alkylation which are polymers of simple olefins. With the higher temperatures noted above, it is desirable to operate at superatmospheric pressures in order to maintain all of the reactants in a liquid state. The reaction time is preferably in the order of 1 to 2 hours although with efficient mechanical dispersion and cooling media, it is possible to obtain substantially the same yields by operation at periods from 15 minutes to ½ hour.

The catalyst to olefin ratio will vary with the particular olefin employed for alkylation, and the particular aromatic chosen, and is best determined by experiment. For example, it has been found that a catalyst to olefin ratio from 0.5 to .15 mols of catalyst per mol of olefin, preferably .1 mol of catalyst per mol of olefin is the preferred range of concentration to use for a large majority of commonly available olefins whether of the simple mono-olefin type or those olefins which are polymers of simple olefins.

Under certain circumstances, it may be desirable to add traces of water or hydrogen chloride up to 5 weight per cent based on the weight of total reactants, although for the majority of olefins studied these additions are not necessary.

The alkylation process of this invention may be carried out in either batch or continuous operation. The apparatus and technique employed in the process have been adequately described in the alkylation art and do not form a part of this invention.

The process of this invention is illustrated by the following example:

To one mol of toluene contained in a flask fitted with a heating and cooling bath, thermometer, and mixing equipment were added 0.1 mol of aluminum chloride and 0.05 mol of chloroform. The temperature was raised to 45° C. by application of heat, mixing started, and one molecular proportion of dodecene-1 was slowly added while maintaining the above temperature over a period of 15 minutes. Stirring was continued for a total of one hour at which time the reaction mixture was treated with water, the upper oil layer washed free of acidic materials and fractionally distilled under vacuum. A yield of dodecyl toluene equal to 91 mol per cent was thereby obtained. The product was water-white, color-stable on storage and showed zero unsaturation when tested by addition of bromine. No polymeric material was found to be present as evidenced by the fact that the product was readily sulfonatable with 100% sulfuric acid to give a sulfonate in theoretical yield containing no unsulfonatable residue.

In like manner, benzene, toluene and xylene were alkylated under the various conditions shown in the table below in which the aluminum chloride-chloroform complex was compared with aluminum chloride by itself or modified with addition of nitromethane, the best aluminum halide modifier of those described in the prior art. The quantities of modifier and catalyst shown in each instance are those which gave the highest yield for the particular aromatic and olefin indicated. The $C_{12}$ polypropylene shown in the table below was made by the non-selective polymerization of propylene in the presence of a phosphoric catalyst available commercially as U. O. P. polymerization catalyst. For the yields shown, no differentiation was found whether the polymer was made in a chamber process employing 300 lbs. per sq. in. pressure or by a tubular process employing 1000 lbs. pressure. The particular polymer fraction chosen for alkylation was a cut from this non-selective polymer boiling between the limits of 180 to 220° C. The bromine number was the theoretical for a $C_{12}$ olefin.

Table I

| Aromatic | Olefin | Modifier | Arom./Olef. Ratio | Catalyst/Olef. Ratio | $AlCl_3$/$CHCl_3$ Ratio | Time: Temp. | Yield, Mol percent of Mono-Alkylate |
|---|---|---|---|---|---|---|---|
| Toluene | $C_{12}$ U. O. P. polypropylene | none | 5:1 | 0.15 | | 2 Hrs., 30° C. | 65 |
| Do | do | $CH_3NO_2$ | 5:1 | 0.15 | | 1 Hr. 50° C. | 83 |
| Do | do | $CHCl_3$ | 5:1 | 0.10 | 2:1 | do | 83 |
| Do | Dodecene-1 | $CH_3NO_2$ | 5:1 | 0.10 | | do | 83 |
| Do | do | $CHCl_3$ | 5:1 | 0.10 | 2:1 | do | 91 |
| Benzene | $C_{12}$ U. O. P. polypropylene | none | 5:1 | 0.10 | | do | 21 |
| Do | do | $CH_3NO_2$ | 5:1 | 0.10 | | do | 30 |
| Do | do | do | 10:1 | 0.10 | | do | 41 |
| Do | do | $CHCl_3$ | 5:1 | 0.10 | 2:1 | do | 57 |
| Do | do | do | 10:1 | 0.10 | 2:1 | do | 62 |
| Do | Dodecene-1 | $CH_3NO_2$ | 5:1 | 0.10 | | do | 70 |
| Do | do | $CHCl_3$ | 5:1 | 0.10 | 2:1 | do | 81 |
| Xylene | $C_{12}$ U. O. P. polypropylene | $CH_3NO_2$ | 5:1 | 0.10 | | do | 43 |
| Do | do | $CHCl_3$ | 5:1 | 0.10 | 2:1 | do | 56 |

It will be noted from a comparison of the results shown in the above table that the aluminum chloride-chloroform complex produces decidedly improved yields of mono-alkylate over either the aluminum chloride alone or aluminum chloride modified by the addition of nitromethane which, by experimentation, has been found to be the best aluminum halide modifier described in the art to date. While the experimental details are not disclosed in the table above, numerous experiments with other alkylation agents such as sulfuric acid, boron fluoride, stannic chloride, hydrofluoric acid have disclosed, that the aluminum halide-chloroform complex described above gives not only the highest yields of mono-alkylate but also gives the minimum of degradation products in the form of either polyalkylated materials or lower alkyl derivatives obtained by the depolymerization of olefinic polymers with subsequent alkylation of the aromatic by these simpler olefins so formed.

The alkylated aromatics described above have many valuable uses in commerce and industry. For example, those alkyl aromatics boiling in the range of 230 to 270° C. have been found to be excellent solvents notably for use in insecticidal and herbicidal compositions. Those boiling in the range of 270° C. up to 360° C. yield excellent detergents unaffected by hard water when sulfonated with a variety of agents such as sulfuric acid, oleum, chlorosulfonic acid, and sulfur trioxide. The higher alkyl aromatic derivatives have been found to be useful in the production of lube oil additives when sulfonated and converted to alkaline earth salts. These higher alkyl aromatic derivatives also furnish excellent emulsifying agents when these sulfonic acids are converted into the alkali salts.

Although the invention has been exemplified by the use of aluminum chloride-chloroform complex, other aluminum halides are equally suitable, for example aluminum bromide, or mixtures of aluminum chloride and aluminum bromide.

The term monoalkylation, as employed in the claims, is defined as a process whereby only one alkyl group derived from the olefin used for alkylation becomes attached to the aromatic nucleus.

Having fully described the invention in a manner so that it may be practiced by those skilled in the art:

What is claimed is:

1. A process for the monoalkylation of aromatic hydrocarbons which comprises contacting an aromatic hydrocarbon with a $C_{12}$ to $C_{18}$-olefin at a temperature in the range of 0° C. and 80° C. in the presence of a catalyst comprising an aluminum chloride-chloroform complex in which the molar ratio of aluminum chloride to chloroform is 2:1.

2. A process according to claim 1 in which the aromatic hydrocarbon is benzene.

3. A process according to claim 1 in which the aromatic hydrocarbon is toluene.

4. A process according to claim 1 in which the aromatic hydrocarbon is xylene.

5. A process for the production of dodecyl toluene which comprises contacting toluene with a $C_{12}$-olefin at a temperature in the range of 0° C. and 80° C. in the presence of a catalyst comprising an aluminum chloride-chloroform complex in which the molar ratio of aluminum chloride to chloroform is 2:1.

6. A process according to claim 5 in which the alkylation is carried out at a temperature in the range of 40° C. to 50° C., and in which the $C_{12}$-olefin is a propylene polymer.

7. A process for the production of dodecyl benzene which comprises contacting benzene with a $C_{12}$-olefin at a temperature in the range of 0° C. and 80° C. in the presence of a catalyst comprising an aluminum chloride-chloroform complex in which the molar ratio of aluminum chloride to chloroform is 2:1.

8. A process according to claim 7 in which the alkylation is carried out at a temperature in the range of 40° C. to 50° C., and in which the $C_{12}$-olefin is a propylene polymer.

CHARLES A. COHEN.
CLIFFORD W. MUESSIG.

REFERENCES CITED

The following references are of record in the file of this patent:

UNITED STATES PATENTS

| Number | Name | Date |
| --- | --- | --- |
| 2,222,012 | Amos et al. | Nov. 19, 1940 |
| 2,232,117 | Kyrides | Feb. 18, 1941 |
| 2,240,583 | Sparks et al. | May 6, 1941 |
| 2,361,355 | Sachanen et al. | Oct. 24, 1944 |
| 2,373,030 | Kimberlin | Apr. 3, 1945 |
| 2,404,340 | Zimmerman | July 16, 1946 |
| 2,437,356 | Hill | Mar. 9, 1948 |
| 2,439,457 | Donleavy | Apr. 13, 1948 |
| 2,457,146 | Grote et al. | Dec. 28, 1948 |

OTHER REFERENCES

Thomas, "Anhydrous Aluminum Chloride In Organic Chemistry," page 101 (1 page only), Reinhold Pub. Corp., New York (1941).

Boeseken, J. Chem. Soc., vol. 84, pages 617–18 (1903 Abstracts), 2 pages.